United States Patent
Berman et al.

(10) Patent No.: US 8,102,399 B2
(45) Date of Patent: Jan. 24, 2012

(54) METHOD AND DEVICE FOR PROCESSING IMAGE DATA STORED IN A FRAME BUFFER

(75) Inventors: Konstantin Berman, Petah-Tikva (IL);
Michael Zarubinsky, Rishon-Lezion (IL)

(73) Assignee: Freescale Semiconductor, Inc., Austin, TX (US)

( * ) Notice: Subject to any disclaimer, the term of this patent is extended or adjusted under 35 U.S.C. 154(b) by 1096 days.

(21) Appl. No.: 11/914,873

(22) PCT Filed: May 23, 2005

(86) PCT No.: PCT/IB2005/051672
§ 371 (c)(1),
(2), (4) Date: Nov. 19, 2007

(87) PCT Pub. No.: WO2006/126042
PCT Pub. Date: Nov. 30, 2006

(65) Prior Publication Data
US 2008/0253694 A1  Oct. 16, 2008

(51) Int. Cl.
*G06F 13/00* (2006.01)
*G06T 1/60* (2006.01)
(52) U.S. Cl. ........................ 345/536; 345/530
(58) Field of Classification Search .................. 345/541, 345/542, 531
See application file for complete search history.

(56) References Cited

U.S. PATENT DOCUMENTS

| | | | |
|---|---|---|---|
| 5,742,788 A | 4/1998 | Priem et al. | |
| 5,767,863 A | 6/1998 | Kimura | |
| 5,943,065 A | 8/1999 | Yassaie et al. | |
| 6,128,026 A | 10/2000 | Brothers, III | |
| 6,765,622 B2 | 7/2004 | Rothnam | |
| 6,853,381 B1 | 2/2005 | Grigor et al. | |
| 7,379,068 B2 * | 5/2008 | Radke | 345/531 |
| 2002/0109695 A1 | 8/2002 | Champion et al. | |
| 2003/0095128 A1 | 5/2003 | Yamada et al. | |
| 2003/0174137 A1 | 9/2003 | Leung et al. | |
| 2003/0210338 A1 * | 11/2003 | Matsuoka et al. | 348/231.99 |

FOREIGN PATENT DOCUMENTS

| | | |
|---|---|---|
| JP | 11296155 A | 10/1999 |
| WO | 0039804 | 6/2000 |

* cited by examiner

*Primary Examiner* — Kee M Tung
*Assistant Examiner* — Jacinta M Crawford

(57) ABSTRACT

A device and method for data image processing. The method includes writing, image data to a certain buffer by an image data provider; characterized by repeating steps of reading, by an image processor image data from a first entry of a certain buffer, processing the image data by the image processor, and writing processed image data to a second entry of the certain buffer; wherein the repeating ends when at least two memory pages of the certain buffer are read; wherein a distance between the first and second entries is smaller than a size of a page of the certain buffer and conveniently much smaller than the size of the page; wherein the second entry includes image data that was previously read by the image processor during the certain period; and preventing an image data provider and an image data retriever form accessing the certain buffer during the repetition.

20 Claims, 6 Drawing Sheets

METHOD AND DEVICE FOR PROCESSING IMAGE DATA STORED IN A FRAME BUFFER

FIELD OF THE INVENTION

The present invention relates to methods and devices for processing image data and especially to high-speed low-latency methods and devices for processing image data.

BACKGROUND OF THE INVENTION

Modern mobile devices, such as but not limited to cellular phones, personal data accessories and the like, include high-resolution full-color displays. These mobile devices are able to display high quality graphics, text, still images and video streams on their display panels. A video stream includes a sequence of images. For convenience of explanation graphics, test, and a still image are referred to as image. The image is represented by image data.

These mobile devices apply a multiple image data process operations in order to provide said high-quality images. Various image data processing operations include downsizing, over-sizing, color conversion, image rotation, alpha blending, de-blocking filtering, de-ringing filtering and the like.

Usually, a single mobile or stationary device can include more than a single image processor (also referred to as image data processor). An image processor is any component that can affect the value of image data by one or more prior art image processing stages. Some of these stages were mentioned above.

A double buffer includes a pair of buffers. Each of this pair of buffers can be accessed by a component, thus a double buffers can be accessed simultaneously by two components. If a video processing sequence is implemented by N processing components, a display controller that retrieves data from a last processing component and a first component that provides the image data to a first processing component then 2*(N+1) buffers or N+1 double buffers are required.

The following patents and patent applications, all being incorporated herein by reference, provide a brief overview of various buffering systems and methods applied for video processing: U.S. Pat. No. 6,765,622 of Rathnam et al., titled "Line-buffer reuse in vertical pixel-processing arrangement"; U.S. Pat. No. 6,128,026 of Brothers, III, titled "Double buffered graphics and video accelerator having a write blocking memory interface and method of doing the same"; and PCT patent application publication serial number WO 00/39804 of Quirk et al., titled "System for dual buffering input to dual port memory for a raster scanned display".

Double buffers are usually implemented by DRAM memories. An image data processor reads information from a first buffer that belongs to a first page of the DRAM memory, processes the image data and then writes the processed image data to a second buffer that belongs to another page of the DRAM memory. During successive read and write operations the image data processor accesses one DRAM page (during the read operation) and then another DRAM page (during the write operation). This access pattern increases the access latency. This latency can affect the performance of the device, especially in devices that perform multiple access to the buffers.

There is a need to provide an efficient device and method for processing image data.

SUMMARY OF THE PRESENT INVENTION

A method and device for processing image data, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The following figures illustrate exemplary embodiments of the invention. They are not intended to limit the scope of the invention but rather assist in understanding some of the embodiments of the invention. It is further noted that all the figures are out of scale.

Figure 1:
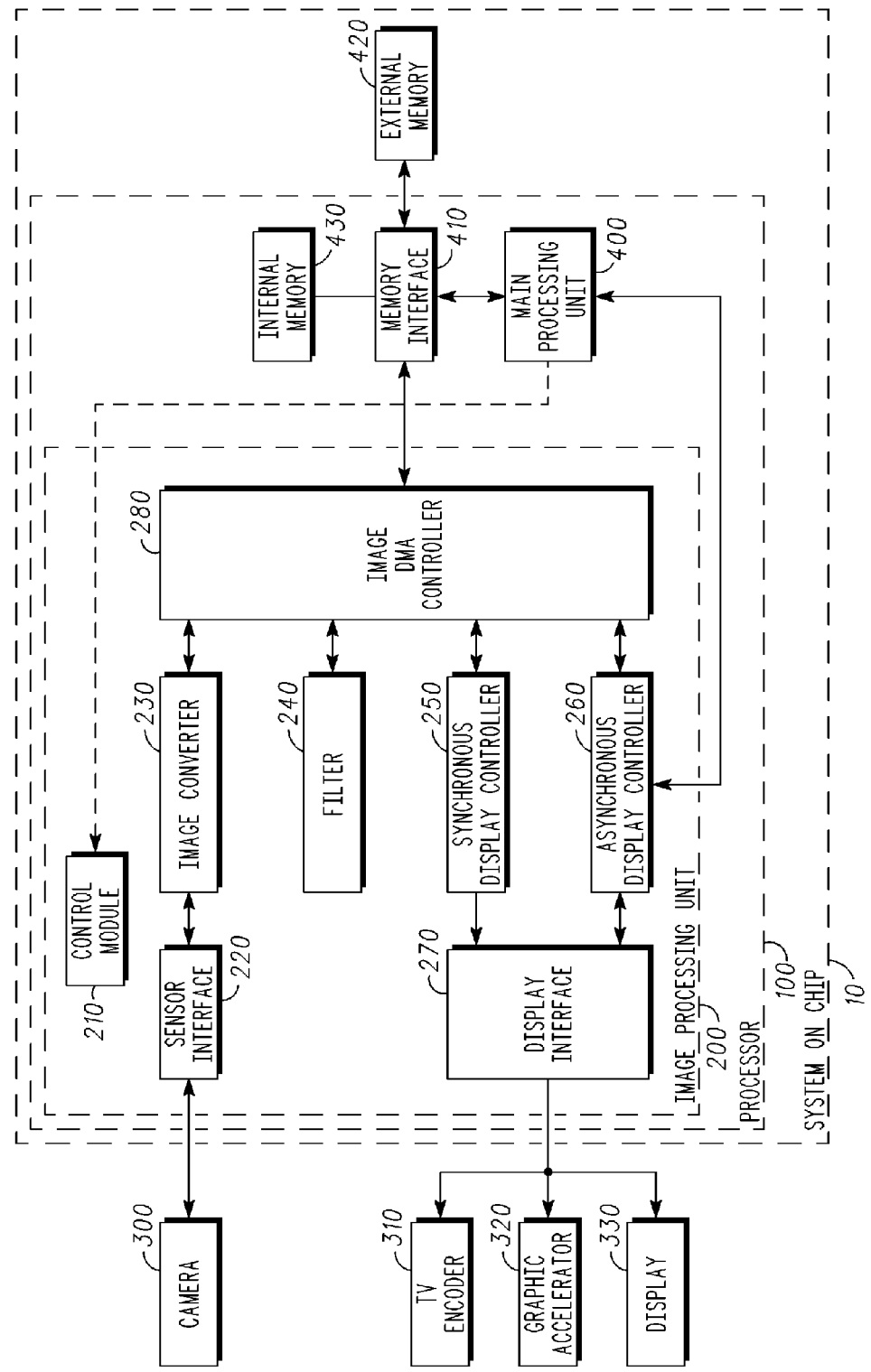
FIG. 1 illustrates a device according to an embodiment of the invention.

FIG. 1 illustrates a device such as system on chip 10, according to an embodiment of the invention.

System on chip 10 includes an external memory 420 and a processor 100. The processor 100 includes an Image Processing Unit (IPU) 200 as well as a main processing unit 400. Main processing unit 400 (also known as "general purpose processing unit", "digital signal processing unit" or just "processing unit") is capable of executing instructions.

System on chip 10 includes multiple components, as well as multiple instruction, control and data buses. For simplicity of explanation only major data buses are shown.

According to various embodiment of the invention the IPU 200 is capable of performing various image processing operations, and interfacing with various external devices, such as image sensors, camera, displays, encoders and the like. The IPU 200 is much smaller than the main processing unit 400 and consumes less power.

The IPU 200 has a hardware filter 240 that is capable of performing various filtering operations such as de-blocking filtering, de-ringing filtering and the like. Various prior art methods for performing said filtering operations are known in the art and require no additional explanation.

By performing de-blocking filtering operation by filter 240, instead of main processing unit 400, the IPU 200 reduces the computational load on the main processing unit 400. In one operational mode the filter 240 can speed up the image processing process by operating in parallel to the main processing unit 400.

IPU 200 includes control module 210, sensor interface 220, image converter 230, filter 240, image Direct Memory Access controller (IDMAC) 280, synchronous display controller 250, asynchronous display controller 260, and display interface 270.

The sensor interface 220 is connected on one side to an image sensor such as camera 300 and on the other side is connected to the image converter 230. The display interface 270 is connected to the synchronous display controller (SDC) 250 and in parallel to the asynchronous display controller 260. The display interface 270 is adapted to be connected to multiple devices such as but not limited to TV encoder 310, graphic accelerator 320 and display 330.

The IDMAC 280 facilitates access of various IPU 200 modules to memory banks such as the internal memory 430 and the external memory 420. The IDMAC 280 is connected to on one hand to the image converter 230, filter 240, SDC 250 and ADC 260 and on the other hand is connected to memory interface 410. The memory interface 410 is connected to internal memory 430 and additional or alternatively, to an external memory 420.

The memory interface 410 receives a request from the IDMAC 280 and determines whether to retrieve the requested information from the external memory 420 or the internal memory 430. The determination can be based upon a mapping between addresses and these memory units 420 and 430.

Typically, the internal memory 430 is relatively small and the external memory 420 is much larger. Conveniently the external memory 420 stores image data.

The sensor interface 220 captures image data from camera 300 or from a TV decoder (not shown). The captured image data can be sent to the image converter 230 for processing or post processing, but the captured data image can also be sent without applying either of these operations to IDMAC 280 the in turn sends it, via memory interface 410 to internal memory 430 or external memory 420.

The image converter 230 is capable of processing image data from the sensor module 220 or processing image data retrieved from the external memory 420. The processing operations include downsizing, resizing, color space conversion (for example YUV to RGB, RGB to YUV, YUV to another YUV), image rotation, up/down and left/right flipping of an image and also combining a video image with graphics.

The display interface 270 is capable of arbitrating access to multiple displays using a time multiplexing scheme. It converts image data form SDC 250, ADC 260 and the main processing unit 400 to a format suitable to the displays that are connected to it. It is also adapted to generate control and timing signals and to provide them to the displays.

The SDC 250 supports displaying video and graphics on synchronous displays such as dumb displays and memory-less displays, as well on televisions (through TV encoders). The ADC 260 supports displaying video and graphics on smart displays.

The IDMAC 280 has multiple DMA channels and manages access to the internal and external memories 430 and 420.

Figures 2, 3:
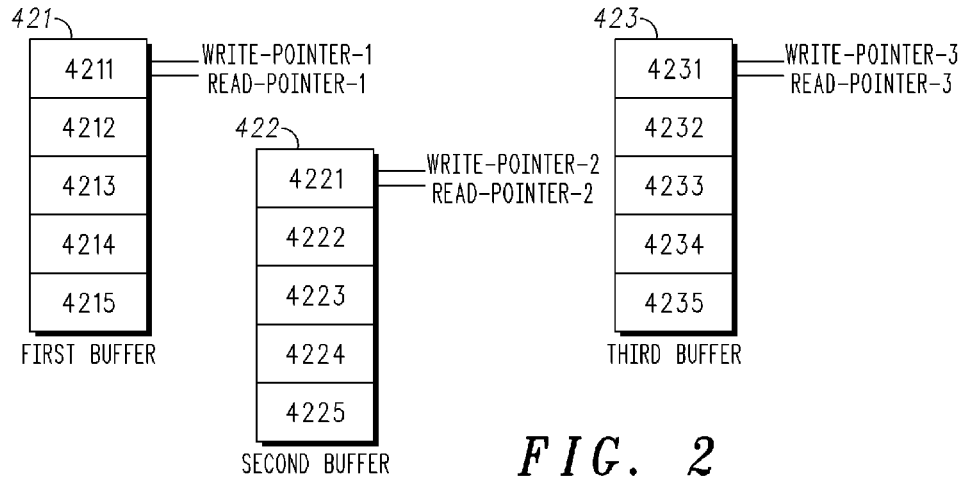
FIG. 2 illustrates three buffers, according to an embodiment of the invention.
FIG. 3 is a timing diagram that illustrates an image data processing sequence, according to an embodiment of the invention.

FIG. 2 illustrates three buffers 421, 422 and 423 within the external memory 420, according to an embodiment of the invention.

Each buffer has five pages 4211-4215, 4221-4225 and 4231-4235.

The read pointer and write pointer of buffer 421 are denoted read-pointer-1 and write-pointer-1. The read pointer and write pointer of buffer 422 are denoted read-pointer-2 and write-pointer-2. The read pointer and write pointer of buffer 423 are denoted read-pointer-3 and write-pointer-3.

According to an embodiment of the invention an image data processor such as image converter 230 reads and writes to a certain buffer and the difference between the read pointer and the write pointer is small. Thus, most of the time the image converter 230 reads image data and writes image data to the same page.

Conveniently, the first and second entries are proximate to each other. Conveniently, the second entry includes image data that was previously read by the image processor during the certain period Conveniently, the distance between the first and the second entries is smaller than a size of one page of the certain buffer. Conveniently, the distance is smaller than one tenth of the size of the page.

Conveniently, the difference between the read pointer and the write pointer is determined in response to various parameters including the size of information bursts that can be transfer during a single memory access, a size of an optional memory cache (or internal memory) that is connected to the image data processor, and the amount of information required to perform a certain image data processing operation. For example, certain pixel operations (such as de-blocking filtering) require image data of pervious pixels.

Each pixel of an image is represented by multiple pixel components such as RGB, YUV and the like. There different pixel components can be stored in a interleaved manner (in which the various pixel components are stored one after the other) or in a non-interleaved manner in which different pixel components are stored in different buffers.

It is assumed that each buffer stores image data in an interleaved manner. Otherwise, three (or more) buffers are required to store the three different components.

FIG. 3 is a timing diagram that illustrates an image data processing sequence 500, according to an embodiment of the invention.

The image data processing sequence 500 is executed by an image data provider such as main processing unit 400, an image processor such as image converter 230 and an image data retriever such as asynchronous display controller 260.

It is noted that when a component (out of main processing unit 400, image converter 230 and asynchronous display controller 260) accesses a certain buffer the other components are prevented from accessing the same buffer. This can be implemented in various manners, including locking the buffer by the first component that accessed the buffer. For example, during the first period P1 510 the image converter 230 and the asynchronous display controller 260 cannot access the first buffer 421.

During a first period P1 510 the main processing unit 400 writes image data to the first buffer 421. The main process unit 400 conveniently fills the first buffer 421 with image data, or at least writes image memory data to two pages of the first buffer 421.

During a second period P2 520 the main processing unit 400 writes image data to the second buffer 422. The image converter 230 reads image data from the first buffer 421, processes the image data and writes the processed image data to the first buffer 421. The image converter 420 writes to entries that previously stored image data that was read by the image converter 230 during second period P2.

During the second period P2 520 write-pointer-1 follows read-pointer-1, and the distance between them is relatively small, especially in comparison to the size of a memory page. Thus, both pointers point to entries that belong to the same memory page except for short pointer transitions from one page to another.

During a third period P3 530 the main processing unit 400 writes image data to the third buffer 423. The image converter 230 reads image data from the second buffer 422, processes the image data and writes the processed image data to the second buffer 422. It writes processed image data to entries that store image data that was read by the image converter 230 during the third period P3 530. During the third period P3 530 write-pointer-2 follows read-pointer-2, and the distance between them is relatively small, especially in comparison to the size of the page. Thus, both pointers point to entries that belong to the same page except for short transitions of these pointers from one page to another.

During the third period P3 530 the asynchronous display controller 260 reads image data from the first buffer 421.

During a fourth period P4 540 the main processing unit 400 writes data to the first buffer 421, the image converter 230 reads image data from the third buffer 423, processes the image data and writes the processed image data to the third buffer 423, and the asynchronous display controller 260 reads image data from the second buffer 421.

During a fifth period P5 550 the main processing unit 400 writes data to the second buffer 422, the image converter 230 reads image data from the first buffer 421, processes the image data and writes the processed image data to the first buffer 421 and the asynchronous display controller 260 reads image data from the third buffer 423.

Assuming that the writing process ends at the fifth period P5 550 then during a sixth period P6 560 the image converter 230 reads image data from the second buffer 422, processes the image data and writes the processed image data to the second buffer 422 and the asynchronous display controller 260 reads image data from the first buffer 421.

During a seventh period P7 570 the asynchronous display controller 260 reads image data from the second buffer 422.

Figure 4:
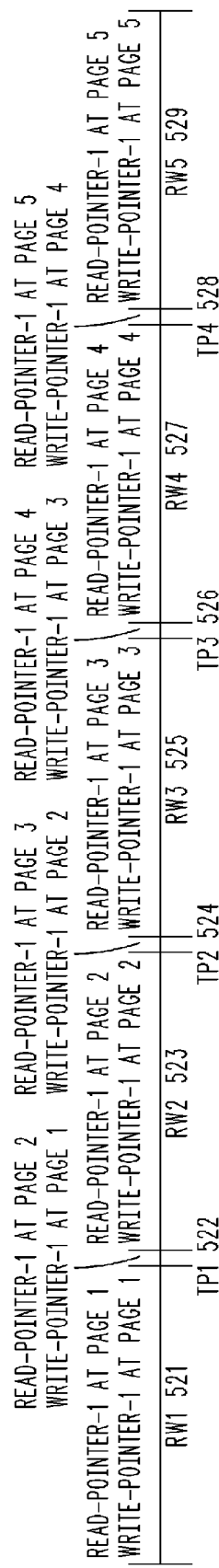
FIG. 4 illustrates in greater detail the read and write operation preformed by the image converter during the second period, according to an embodiment of the invention.

FIG. 4 illustrates in greater detail the read and write operation preformed by the image converter 230 during the second period P2 520.

It is assumed that the image converter reads image information that fills the first buffer, that the difference (deltaEnrty) between the read and write pointers (read-pointer-1 and write-pointer-1) is relatively small and that a small time difference (deltaT) separates between a read operation of a certain entry to a write operation of that same entry.

The second period P2 520 includes five sub-periods RW1-RW5 521, 523, 525, 527 and 529 and four transition periods TP1-TP4 522, 524, 526 and 528.

During the k'th sub-period (k=1, 2, 3, 4, 5) both read-pointer-1 and write-pointer-1 point to entries that belong to the k'th page.

Each transition period is short and is about deltaT long. During the k'th transition period (k=1, 2, 3, 4) read-pointer-1 points to entries in the (k+1)'th page of the first buffer 421 while the write-pointer-1 points to entries in the k'th page of the first buffer 421.

Figure 5:
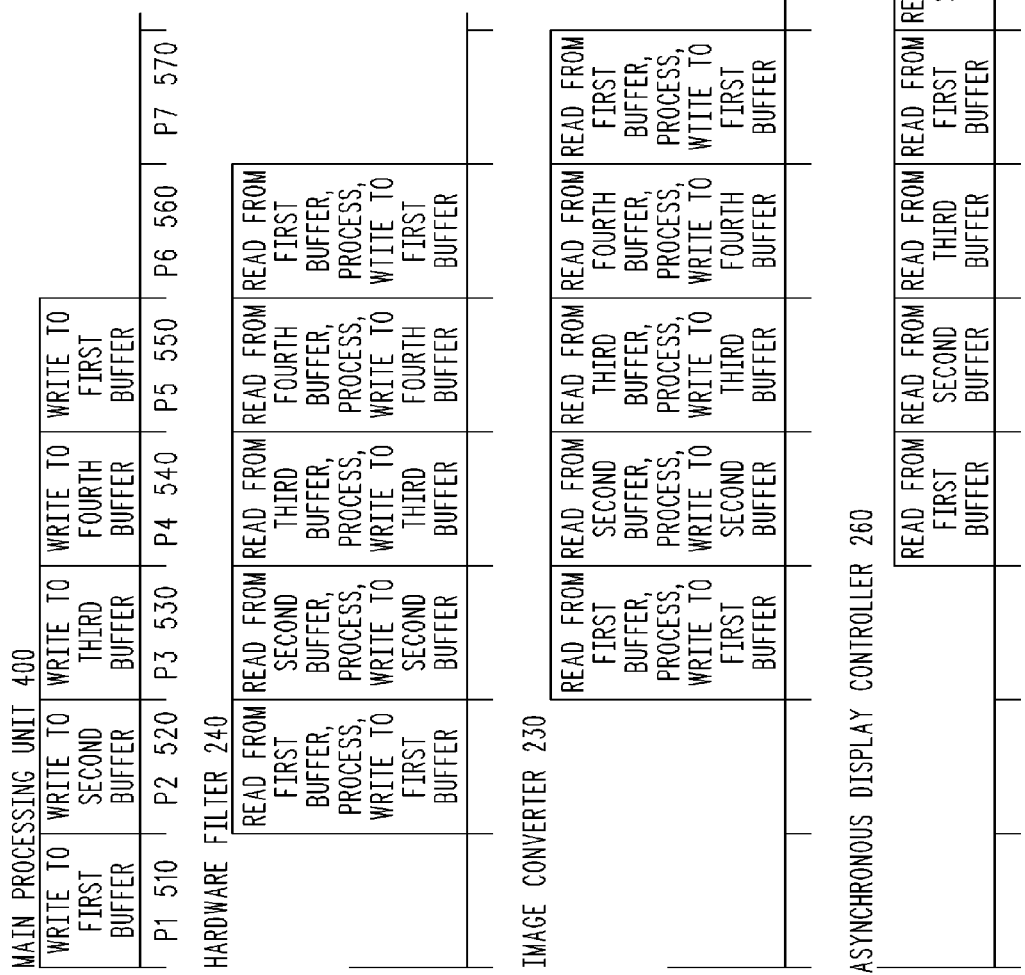
FIG. 5 is a timing diagram that illustrates another image data processing sequence, according to another embodiment of the invention.

FIG. 5 is a timing diagram that illustrates another image data processing sequence 600, according to an embodiment of the invention.

The image data processing sequence 600 is executed by an image data provider such as main processing unit 400, two image processors such as image converter 230 and hardware filter 240, and an image data retriever such as asynchronous display controller 260.

In order to efficiently support these four components a fourth buffer 424 is introduced.

It is noted that every processing unit accesses a buffer by performing read and write operations while maintaining a small difference between the read and write pointers. It is noted that this difference can differ from one processing unit to another due to difference in the type of data processing, the amount of pixel information required for processing, difference in data retrieval capabilities and the like.

During a first period P1 510 the main processing unit 400 writes image data to the first buffer 421. The main process unit 400 conveniently fills the first buffer 421 with image data.

During a second period P2 520 the main processing unit 400 writes image data to the second buffer 422. The hardware filter 240 reads image data from the first buffer 421, processes the image data and writes it back to the first buffer 421, especially to entries that store image data that was read by the hardware filter 240 during second period P2.

During a third period P3 530 the main processing unit 400 writes image data to the third buffer 423. The hardware filter 240 reads image data from the second buffer 422, processes the image data and writes it back to the second buffer 422, especially to entries that store image data that was read by the hardware filter 240 during the third period P3 530.

During the third period P3 530 write-pointer-2 follows read-pointer-2, and the distance between them is relatively small, especially in comparison to the size of the page.

During the third period P3 530 the image converter 230 reads image data from the first buffer 421, processes the image data and writes it back to the first buffer 421, especially to entries that store image data that was read by the image converter 230 during the third period P3 530. During the third period P3 530 write-pointer-1 follows read-pointer-1, and the distance between them is relatively small, especially in comparison to the size of the page.

During a fourth period P4 540 the main processing unit 400 writes data to the fourth buffer 424, the hardware filter 240 reads image data from the third buffer 423 and writes image data to the third buffer 423, the image converter 230 reads image data from the second buffer 422 and writes image data to the second buffer 422, and the asynchronous display controller 260 reads image data from the first buffer 421.

During a fifth period P5 550 the main processing unit 400 writes data to the first buffer 421, the hardware filter 240 reads image data from the fourth buffer 424 and writes image data to the fourth buffer 424, the image converter 230 reads image data from the third buffer 423 and writes image data to the third buffer 423, and the asynchronous display controller 260 reads image data from the second buffer 422.

Assuming that the writing process ends at the fifth period P5 550 then during a sixth period P6 560 the hardware filter 240 reads image data from the first buffer 421 and writes image data to the first buffer 421, the image converter 230 reads image data from the fourth buffer 424 and writes image data to the fourth buffer 424, and the asynchronous display controller 260 reads image data from the third buffer 422.

During a seventh period P7 570 the image converter 230 reads image data from the first buffer 421 and writes image data to the first buffer 421, and the asynchronous display controller 260 reads image data from the fourth buffer 424.

During an eighth period P8 the asynchronous display controller 260 reads image data from the first buffer 421.

Figure 6:
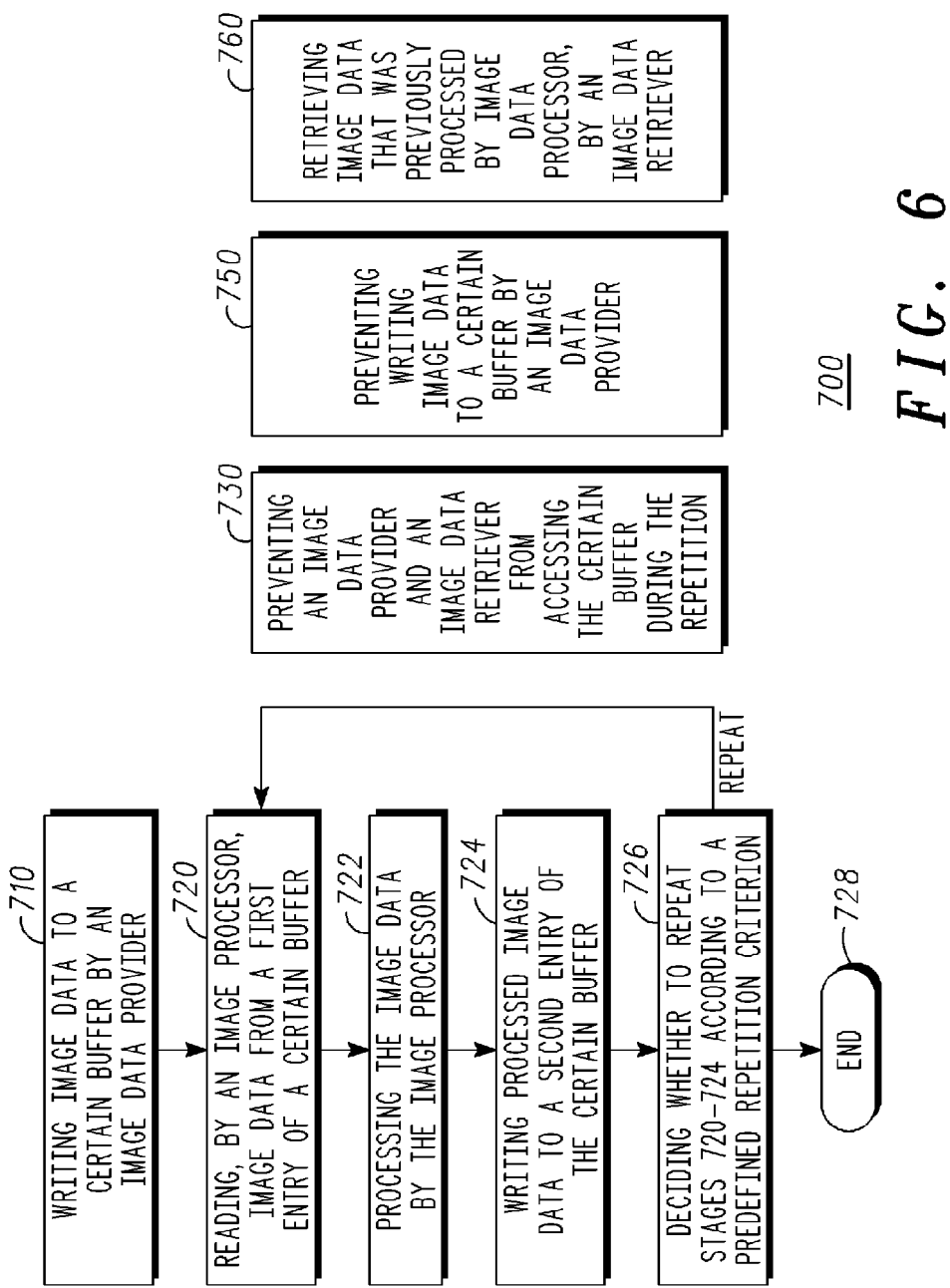
FIG. 6 is a flow chart of a method for processing image data, according to an embodiment of the invention.

FIG. 6 is a flow chart of a method 700 for processing image data, according to an embodiment of the invention.

Method 700 starts by stage 710 of writing image data to a certain buffer by an image data provider.

Conveniently, stage 710 is executed before stages 720 and 730 during a first iteration of method 700. During other iterations of method 700 it is executed in parallel to stages 720 and 730.

Referring to the example set forth in FIG. 3, the main processing unit 400 writes to a first buffer during first period P1 510, while the image converter remains idle. During a second period P2 520 the main processing unit 400 writes to as second buffer while the image converter reads image data from the first buffer, processes it and writes the processed image data to the first buffer.

It is further noted that stages 710-760 can be repeated multiple times, until a predefined amount of image data is received, processed and retrieved.

Stage 710 is followed by stage 730 and by stage 720.

Stage 720 includes reading, by an image processor, image data from a first entry of a certain buffer. Stage 720 is followed by stage 722 of processing the image data by the image processor. Stage 722 is followed by stage 724 of writing processed image data to a second entry of the certain buffer.

Conveniently, the first and second entries are proximate to each other. Conveniently, the second entry includes image data that was previously read by the image processor during the certain period Conveniently, the distance between the first and the second entries is smaller than a size of one page of the certain buffer. Conveniently, the distance is smaller than one tenth of the size of the page.

Stage 724 is followed by stage 726 of deciding whether to repeats stages 720-724 according to a predefined repetition criterion.

According to an embodiment of the invention the repetition ends when at least two memory pages of the certain buffer are read. Conveniently the repetition ends when the whole buffer is read. If the repetition ends stage 726 is followed by stage 720, else it is followed by "END" stage 728.

Stage 730 includes preventing an image data provider and an image data retriever form accessing the certain buffer during the repetition.

Method 700 also includes stages 750 and 760. Stage 750 includes writing image data to a certain buffer by an image data provider. Stage 760 includes retrieving image data that was previously processed by image data processor, by an image data retriever. The retrieved image data can be sent to a display, sent to a display controller or sent to another memory unit.

Stages 750 and 760 are executed in parallel to stages 720-726. It is noted that this parallelism does not occur during initial iterations and final iterations of method 700. Thus, for example, the data retrieval stage 760 ends at least one period after the data processing ends.

Figure 7:
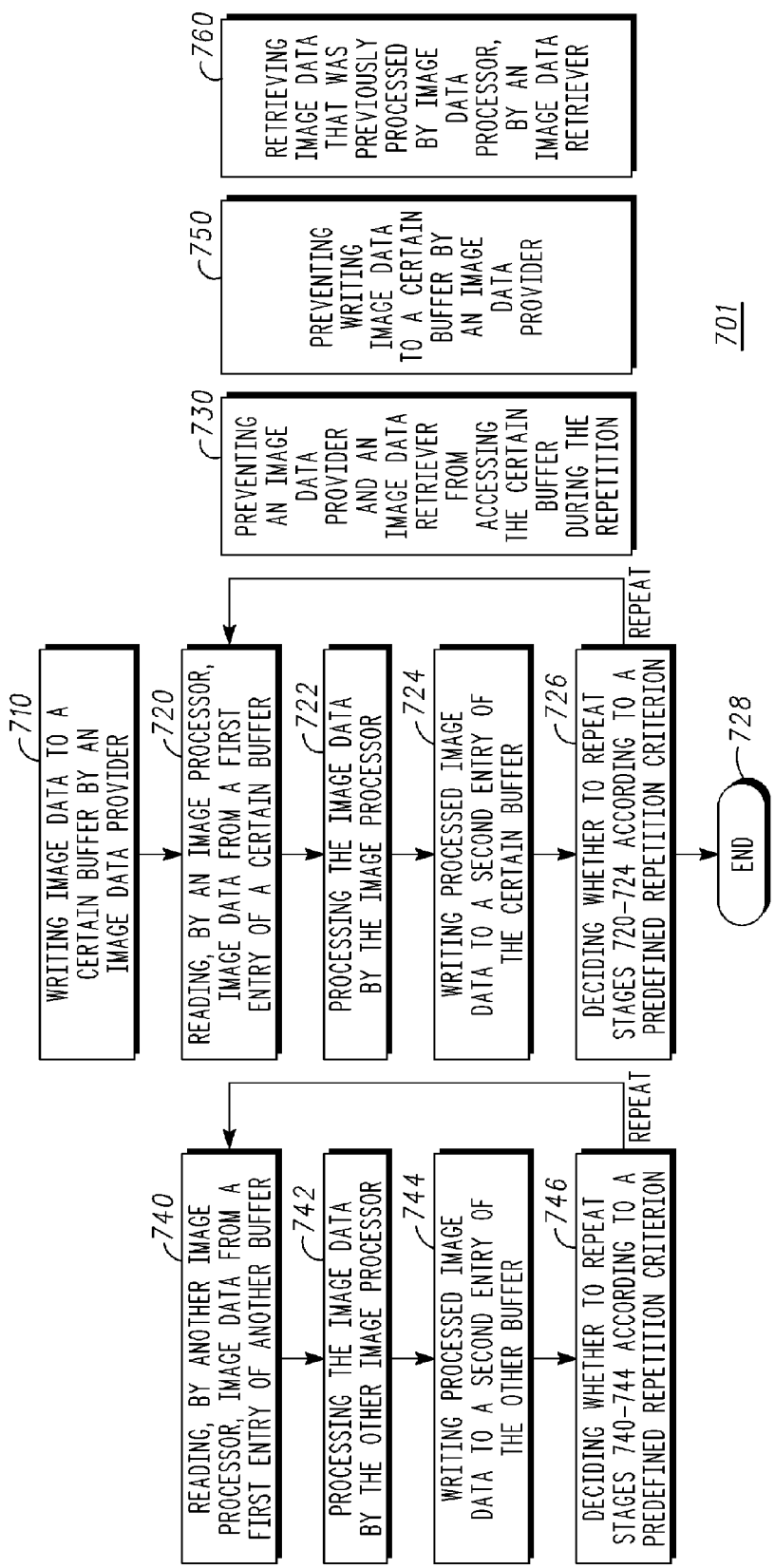
FIG. 7 is a flow chart of another method for processing image data, according to another embodiment of the invention.

FIG. 7 is a flow chart of a method 701 for processing image data, according to an embodiment of the invention.

Method 701 differs from method 700 by including additional processing stages that are executed by an additional image data processor. Both image data processors can operate in a pipelined manner thus during many iterations of method 701 they operate in parallel, on different image data stored in different buffers.

Method 701 includes a repetition of stages 740-744. Stage 740 includes reading, by another image processor image data from a first entry of another buffer. Stage 742 includes processing the image data by the other image processor. Stage 744 includes writing processed image data to a second entry of the other buffer.

It is noted that more than three image processors can participate in the image data processing sequence.

By using the proposed methods, if a video processing sequence is implemented by N processing components, a display controller that retrieves data from a last processing component and a first component that provides the image data to a first processing component then N+2 buffers are required.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A device comprising:
   an image data provider;
   an image processor; and
   an image data retriever;
   three buffers, wherein each buffer includes multiple memory pages;
   wherein during a certain period the image processor performs a read operation of image data from a first entry of a certain buffer, performs an image data processing operation on the read image data and performs a write operation of processed image data to a second entry of the certain buffer, the first entry different from the second entry;
   wherein a distance between the first and second entries is smaller than a size of a page of the certain buffer;
   wherein the second entry includes image data that was previously read by the image processor during the certain period;
   wherein the image processor repeats the read, image data processing and write operations until it reads at least two pages of the certain buffer;
   wherein during that certain period the image data provider and image data retriever are prevented from accessing the certain buffer.

2. The device according to claim 1 wherein the image processor reads image data and writes processed image data in a sequential manner.

3. The device according to claim 2, wherein the first and second entries are proximate to each other.

4. The device according to claim 2, wherein the distance between the first and the second entries is smaller than one tenth of the size of the page.

5. The device according to claim 1, comprising at least one additional image processor and at least one additional buffer.

6. The device according to claim 5, wherein the first and second entries are proximate to each other.

7. The device according to claim 5, wherein the distance between the first and the second entries is smaller than one tenth of the size of the page.

8. The device according to claim 1, wherein during a majority of the second period the image processor reads image data from a certain buffer page and writes processed image data to the certain buffer page.

9. The device according to claim 1, wherein a single integrated circuit comprises the image data provider, the image processor and the image data retriever.

10. The device according to claim 1, wherein the first and second entries are proximate to each other.

11. The device according to claim 1, wherein the distance between the first and the second entries is smaller than one tenth of the size of the page.

12. A method for data image processing, the method comprises:
   writing, image data to a certain buffer by an image data provider;
   repeating steps of reading, by an image processor image data from a first entry of a certain buffer, processing the image data by the image processor, and writing processed image data to a second entry of the certain buffer, the first entry different from the second entry;
   wherein the repeating ends when at least two memory pages of the certain buffer are read;
   wherein a distance between the first and second entries is smaller than a size of a page of the certain buffer;

wherein the second entry includes image data that was previously read by the image processor during the certain period; and preventing an image data provider and an image data retriever from accessing the certain buffer during the repetition.

13. The method according to claim 12 further comprising repeating steps of reading, by another image processor image data from a first entry of another buffer, processing the image data by the other image processor, and writing processed image data to a second entry of the other buffer.

14. The method according to claim 13 wherein one image processor operation comprises re-sizing and another image processing operation comprises filtering.

15. The method according to claim 14, wherein the first and second entries are proximate to each other.

16. The method according to claim 13, wherein the first and second entries are proximate to each other.

17. The method according to claim 13, wherein the distance between the first and the second entries is smaller than one tenth of the size of the page.

18. The method according to claim 12, wherein the repetition of reading, processing and writing involves accessing entries that belong to the same memory page.

19. The method according to claim 12, wherein the first and second entries are proximate to each other.

20. The method according to claim 12, wherein the distance between the first and the second entries is smaller than one tenth of the size of the page.

* * * * *